United States Patent
Sacks et al.

(10) Patent No.: US 6,336,220 B1
(45) Date of Patent: Jan. 8, 2002

(54) PROTECTIVE ELEMENT

(75) Inventors: Michael Sacks, Manchester; Peter Sajic, Broadstone; William Zuill, West Winterslow, all of (GB)

(73) Assignee: Trauma-Lite Limited, Manchester (GB)

( * ) Notice: Subject to any disclaimer, the term of this patent is extended or adjusted under 35 U.S.C. 154(b) by 0 days.

(21) Appl. No.: 09/661,200

(22) Filed: Sep. 13, 2000

Related U.S. Application Data (63) Continuation-in-part of application No. 09/084,393, filed on May 27, 1998, now abandoned.

(30) Foreign Application Priority Data

| May 29, 1997 | (GB) | ................................................ 9711109 |
| Oct. 17, 1997 | (GB) | ................................................ 9722024 |
| Nov. 25, 1997 | (GB) | ................................................ 9724904 |

(51) Int. Cl.[7] ............................................. A41D 13/00
(52) U.S. Cl. ............................. 2/22; 2/16; 2/24; 2/412; 116/203; 428/73; 428/116
(58) Field of Search .............................. 2/455, 16, 20, 2/22, 24, 410, 411, 412, 414; 36/28, 29; 428/73, 116, 118; 116/203, 212

(56) References Cited

U.S. PATENT DOCUMENTS

| 3,447,163 A | 6/1969 | Bothwell et al. |
| 3,783,534 A | 1/1974 | Phillips et al. |
| 4,422,183 A | * 12/1983 | Landi et al. |
| 4,485,568 A | * 12/1984 | Lnadi et al. |
| 4,538,301 A | * 9/1985 | Sawatzki et al. |
| 4,845,863 A | 7/1989 | Yung-Mao |
| 5,110,653 A | 5/1992 | Landi |
| 5,122,405 A | 6/1992 | Landi |
| 5,152,081 A | 10/1992 | Hallenbeck et al. |
| 5,174,049 A | 12/1992 | Flemming |
| 5,203,607 A | 4/1993 | Landi |
| 5,289,878 A | * 3/1994 | Landi et al. |
| 5,349,893 A | 9/1994 | Dunn |
| 5,496,610 A | 3/1996 | Landi et al. |
| 5,561,866 A | 10/1996 | Ross |
| 5,794,271 A | 8/1998 | Hastings |
| 6,151,714 A | * 11/2000 | Pratt ................................ 2/24 |

FOREIGN PATENT DOCUMENTS

FR 2566632 * 1/1986

* cited by examiner

Primary Examiner—Rodney M. Lindsey
(74) Attorney, Agent, or Firm—Baker Botts L.L.P.

(57) ABSTRACT

A protective element is provide in which a honeycomb element for absorbing impact loads is sandwiched between a forward facing load spreading layer and a foam backing. The forward facing layer is transparent so that the condition of the honeycomb can be inspected.

43 Claims, 12 Drawing Sheets

PROTECTIVE ELEMENT

This application is a continuation-in-part of U.S. patent application Ser. No. 09/084,393, filed on May 27, 1998, and now abandoned, entitled "PROTECTIVE ELEMENT."

The present invention relates to a protective element. Such an element may be incorporated within protective clothing, such as shinpads and ankle protectors, jackets, footwear and helmets. The protective element may also be incorporated in containers, luggage bags or suitcases in order to protect the contents thereof.

Known shinpads typically comprise a plastic outer shell with a soft foam backing for comfort. Such a design does not cater for shock load energy management. Furthermore, the protective outer element can become damaged without the user knowing that such damage has occurred. Thus the protection offered by the pad to subsequent impact is reduced.

According to a first aspect of the present invention, there is provided a protective element comprising a first layer arranged adjacent a multicelled element, and in which the multicelled element can be visually inspected.

The multicelled element acts as a main energy absorbing and dissipating element.

Preferably the multicelled element is a honeycomb element. However, the term "honeycomb element" should be construed broadly to included structures having any shape of open cell with adjacent cells separated by walls. Thus the cells can have almost any shape, for example circular, hexagonal, rectangular, elliptical, square, trapezium, trapezoid or irregular. Furthermore, the walls need not be of uniform thickness, either across the surface of the protective element, nor in the direction perpendicular to the local surface of the protective element.

Preferably a second layer is also provided, the fist and second layers being arranged on opposite sides of the multicelled element. Thus the multicelled element forms a core of the protective element.

Preferably the protective element is arranged such that, in use, the first layer faces "outwardly" towards a direction of threat and the second layer faces "inwardly" towards the item being protected.

Preferably the first layer acts as an outer skin which transmits the load of any impact to the multicelled element. The second layer may form an inner skin which acts as a support for the multicelled element.

Preferably the outer layer is thicker than the inner layer in order to give it improved resistance to impact loads and resistance to other damage that may occur during normal use. Preferably the first layer is a thermo-plastic material, such as polycarbonate, polypropylene or ABS tec. Alternatively the first layer may be a reinforced plastic material consisting of high tensile fibres, such as carbon, glass, kevlar or dyneema embedded in a thermosetting resin such as an epoxy or a thermoplastic resin such as polyetherimide.

The inner layer may comprise a foam in order to provide a relatively soft surface in contact with the item to be protected. Additionally or alternatively the inner layer may also comprise the same materials as the outer layer.

The multicelled element could be made of any suitable material, such as metals, commonly aluminium, plastic, glass, reinforced plastics, thermoplastics, composites containing fibres embedded in a plastic matrix or paper. The combination of multicelled element materials, thickness, and materials used in the first and second layers may be varied to tune the response of the protective element to specific dynamic impact loads. Furthermore, the construction of the multicelled element may be varied by using different materials, different density or cell size or cell shape to vary the crush load.

Advantageously the protective element is covered with a further layer of abrasion resistant material such as nylon or kevlar, which is selectively removable.

Advantageously the protective element is incorporated within protective clothing, such as a leg pad, shinpad, ankle pad, jacket or helmet. The protective clothing may be designed to hold the protective elements in pockets, such that the protective element can be replaced in the event of damage or removed if it is not required.

The protective element may also be incorporated within footwear, for example in the tongue of a boot, or in an insole. Thus a sports boot may be provided with a tongue incorporating the protective element. Sports boots, such as football boots are generally required to be securely laced to the wearer's feet. A tongue incorporating the protective element will help distribute the load produced by the boot fastenings, such as laces, more evenly across the top of the foot, thereby making the boot more comfortable. Additionally, tests have indicated that a boot incorporating such an element can give rise to a better kick. It is believed that reversible deformation within the protective element allows the contact time with the ball to be increased and that enhances direction and power of a kick.

Additionally the protective element will reduce the risk of broken bones in the event that the foot is stamped upon.

Sport boots may have studs formed in the sole thereof to enhance grip. This can give rise to areas of increased rigidity within a boot which, in turn, can cause blisters. The provision of an insole incorporating a protective element can alleviate the problem since the protective element spreads the load generated near the studs and also cushions the foot.

Advantageously at least one of the first and second layers is transparent or translucent. This enables the condition of the multicelled element to be visually inspected. If both layers are transparent or translucent then light can pass through the layers and through the cells bounded by the walls of the multicelled element. Permanent damage to the multicelled core causes deformation of the walls which in turn closes the holes within the multicelled element. Thus the amount of light transmitted through the multicelled element is reduced in damaged areas of the element. Similarly if the multicelled element is viewed in reflected light, the proportion of light reflected by damaged areas of the multicelled element is greater than that reflected by undamaged areas. However, in hose embodiments only having one layer adjacent the multicelled element, the element can be directly inspected to identify any damage, such as crushing, of the element.

The multicelled element may be coloured or coated such that its colour changes as a result of sustaining damage. The multicelled element may be coated with a thin layer which provides a visually attractive surface to an undamaged multicelled element and which allows damaged areas to be quickly identified by virtue of a change in the colour or reflective properties of the damaged area. One mechanism for the colour change is that the thin layer becomes damaged and ruptured allowing the colour of the underlying material to be viewed.

Alternatively a pressure sensitive layer or film may be provided adjacent to or on the multicelled element. Thus, for example, in an embodiment of the present invention having a multicelled element between first and second layers, where the first layer faces a direction of threat and the multicelled element is visible therethrough, a pressure sensitive layer may be disposed between the multicelled element and the second layer.

The pressure sensitive layer is arranged to release a pigment when the pressure, i.e. force per unit area, exceeds a predetermined pressure. A suitable pressure indicating film is commercially available under tile trade mark PRESSUREX from Fuji paper and may be purchased via Sensor Products Inc. of 188 Rt10, Ste 307, East Hanover, N.J. 07936-2108 USA. The film comes in five pressure ranges, and the indicating force at which the pigment is released can be tailored be selecting an appropriate film and by varying the contact area between the multicelled element and the pressure sensitive layer.

Preferably the thickness of the protective element is between 9 mm and 3 mm. Advantageously the diameter of the cells in the multicelled element are similar to the thickness of the protective element, say in the range of 3 to 9 mm. These dimensions are particularly suited for use in shinpads. However other thicknesses and cell diameters may be selected depending on the specific application.

Preferably the density of the honeycomb core is in the region of 80 kgm$^{-3}$. This density has been found to provide an appropriate level of transverse stiffness. Too high a density results in the protective element transmitting force too readily, whereas too low a density causes it to act like a spring.

A "full face" shinpad constituting an embodiment of the present invention comprises an outer membrane skin of impact resistant material bonded to a honeycomb core. The outer layer and honeycomb core are constructed to have some flexibility in a first direction so that the pad can be adjusted to fit the leg of the user. The inner layer comprises a thin foam layer in order to give structural stability to the pad and to make the pad comfortable to wear. For a segmented shinpad, a plurality of protection elements may be provided as strips which are held in pockets.

According to a second aspect of the present invention, there is provided protective clothing comprising a protective element according to the first aspect of the present invention.

As used herein, the term clothing includes footwear and headwear.

The present invention will further be described, by way of example, with reference to the accompanying drawings, in which.

Figure 1:
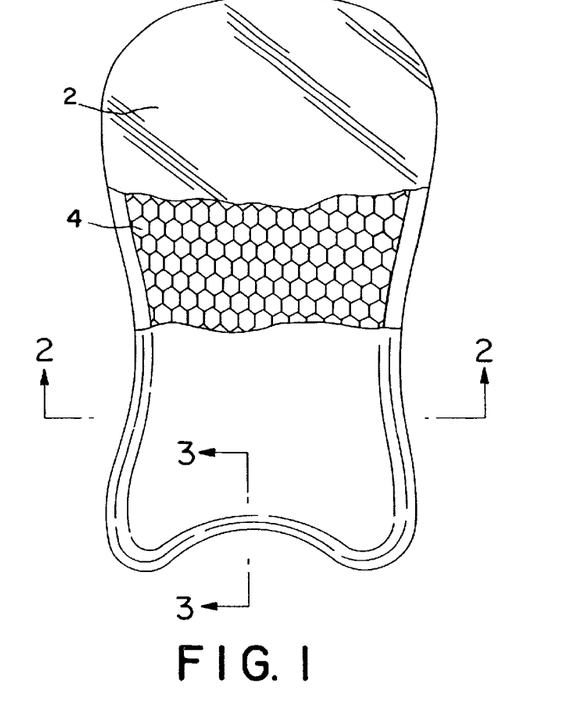
FIG. 1 is a schematic cutaway view of a shinpad constituting an embodiment of the present invention.
Figure 2:
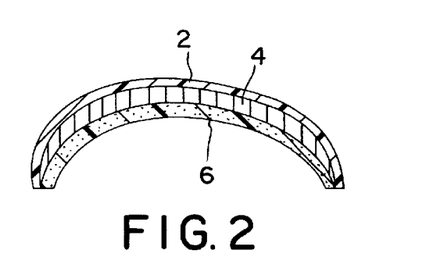
FIG. 2 is a cross section along the line 2—2 of FIG. 1.
Figure 3:
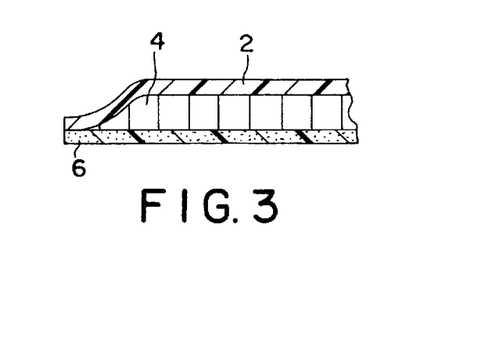
FIG. 3 is a cross section along the direction 3—3 of FIG. 1.

The shinpad shown in FIGS. 1 to 3 is a full face shinpad comprising a transparent outer shell formed from a material such as polycarbonate, polypropylene, a thermoplastic or a thermoplastic composite material. Beneath the outer shell 2 is a honeycomb layer formed of aramid, paper, metal, fibrous material or thermoplastic material in a layer 4 typically between 6 and 9 mm thick at its thickest point. The innermost layer 6, comprises a foam backing typically between 4 and 5 mm thick. The honeycomb layer 4 is bonded to the outer shell in order to provide a semi rigid structure which allows energy absorption through crushing of the honeycomb 4. The soft foam 6 is bonded to the inside of the honeycomb in order to provide a comfortable feel to the user.

Figure 4:
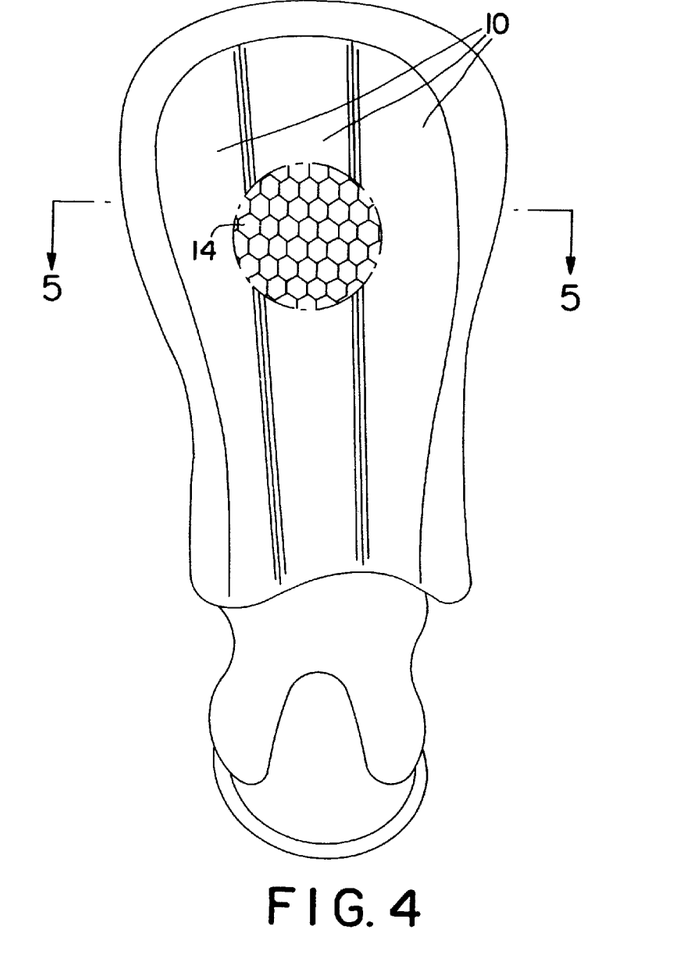
FIG. 4 is a schematic cutaway view of a leg protector constituting a further embodiment of the present invention.

FIGS. 4 to 8 show the construction of a segmented shinpad constituting a second embodiment of the present invention. FIG. 4 shows a front view of the shinpad which comprises three pockets 10 formed from a nylon fabric. Each pocket encloses a trauma strip which is an elongate element 12 comprising an outer layer, a honeycomb and an inner layer substantially as hereinbefore described with respect to the first embodiment. The provision of the honeycomb layer is schematically represented in the encircled region 14 of FIG. 4.

Figure 5:
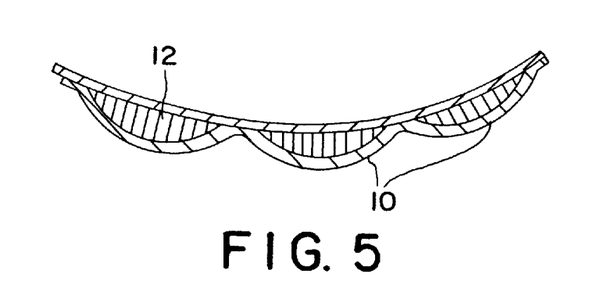
FIG. 5 is a cross section along the line 5—5 of FIG. 4.

FIG. 5 is a cross sectional view along the lines of 5—5 of FIG. 4 and shows the former strips 12 holding the individual pockets 10. Each former strip has a maximum thickness of between 6 and 9 mm. This form of construction ensures flexibility in a direction transverse to the longitudinal axis of the former strip, thereby enabling the pad to be wrapped round the user's leg.

Figure 6:
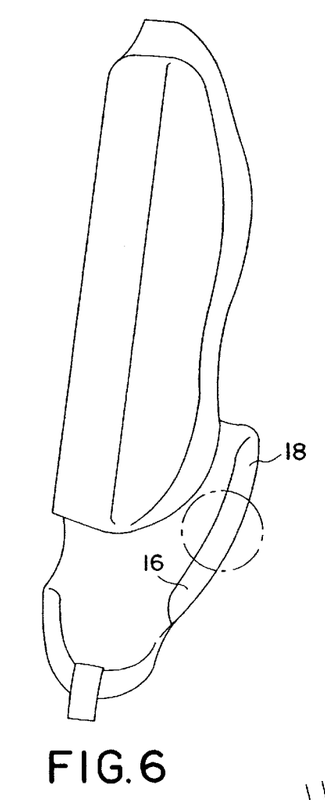
FIG. 6 is a side view of the leg protector shown in FIG. 4.
Figure 7:
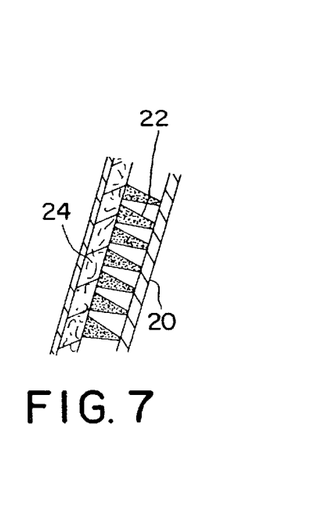
FIG. 7 is a cross section through the circle region shown in FIG. 6.

As shown in FIG. 6, the pad may also include a rear guard 16 in the form of an elasticated sock in order to protect the Achilles heal and back of the leg. The rear guard 16 includes a trauma pack 18 having a honeycomb sandwich construction as hereinbefore described, typically comprising a kevlar outer skin 20, a 3–4 mm honeycomb insert 22 and a 3 mm thick foam backing 24, as shown in FIG. 7. It would be appreciated that the honeycomb insert need not be bonded to the layers which sandwich it, thereby enabling the honeycomb insert to be removed in the event of damage.

Figure 8:
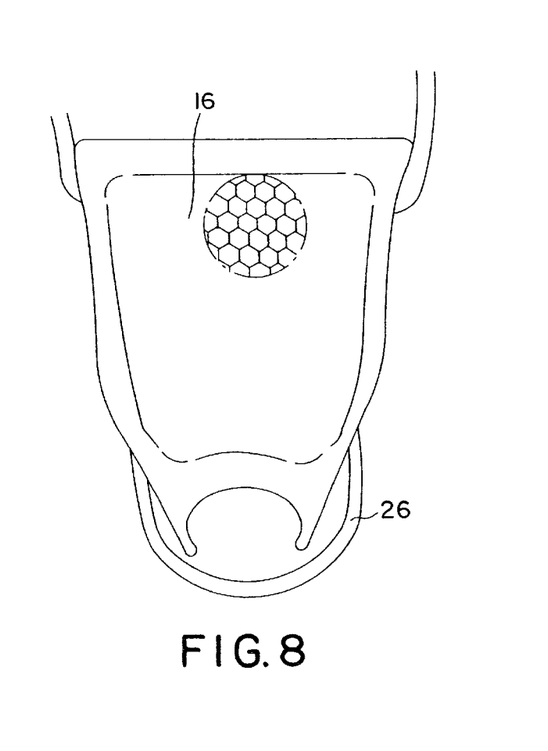
FIG. 8 is a rear view of part of the protector shown in FIG. 6.

FIG. 8 shows a rear view of a protective element 16. The leg protector/shinpad may include a foot strap 26 which, in use, passes underneath the foot in order to hold the pad against longitudinal movement with respect to the leg.

In each of the above described arrangements, the outer shell is made transparent in order that the condition of the honeycomb core can be inspected to ascertain if the pad's ability to provide protection has become compromised. The pad, or the individual trauma strips, can then be replaced as appropriate. Inspection may involve merely looking for depressions in the honeycomb core or deformation of the walls thereof. The honeycomb layer may be coated with a thin layer, for example of a metal such as chromium, which provides a visually attractive finish. The deformation of the honeycomb causes this layer to become damaged and perforated or cracked, thereby spoiling the visual appearance and allowing damaged areas to be easily identified. The colour of the underlying honeycomb may be seen through the damaged layer.

Figure 9:
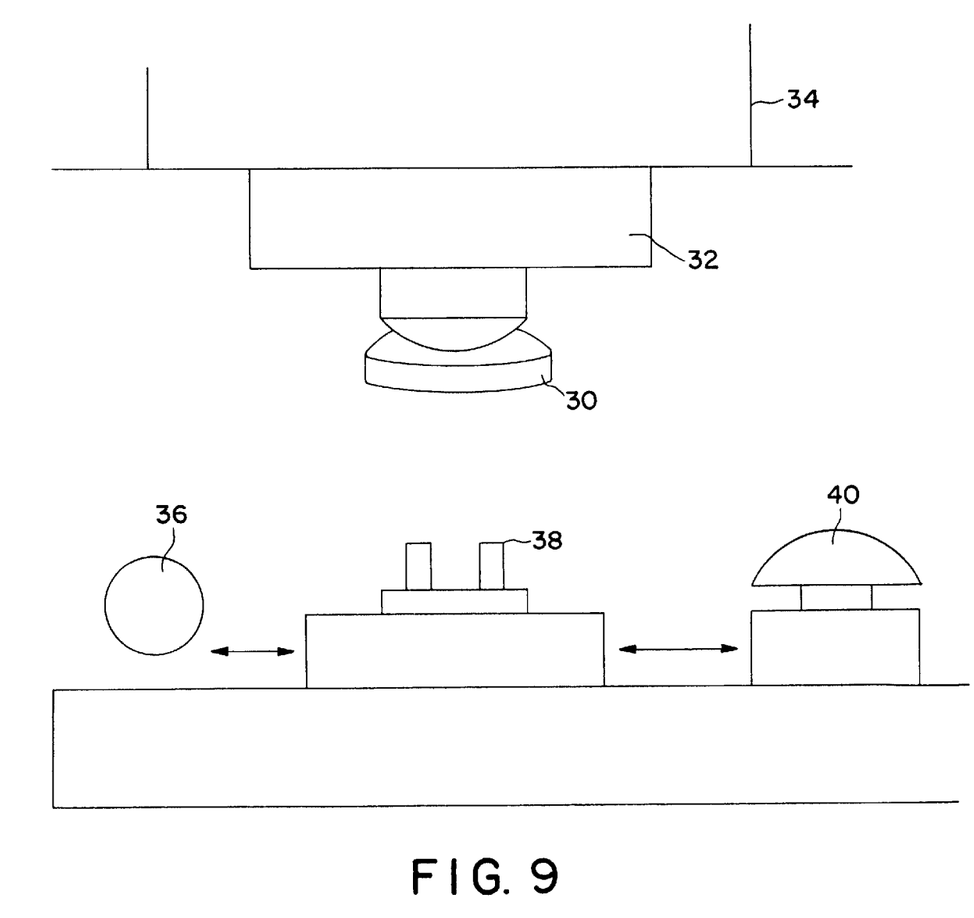
FIG. 9 is a schematic diagram showing a test arrangement for testing shinpads.

FIG. 9 schematically illustrates a test arrangement which has been used to perform comparative tests on shinpads constituting embodiments of the present invention and prior art shinpads. As shown in FIG. 9, the shinpad under test 30 is secured to a holding jig 32 having a weight of 5.5 kilogrammes the jig 32 is secured by guide wires 34 that constrain it to move vertically. The shinpad under test 30 drops through a height of 0.5 meters onto test surfaces comprising a roll bar 36, a triangular pattern of football studs 38, or a steel hemispherical anvil 40. Four sensors, not shown, measure the dynamic force occurring during the test as the holding jig is bought to a rest against the test object.

Figure 10A:
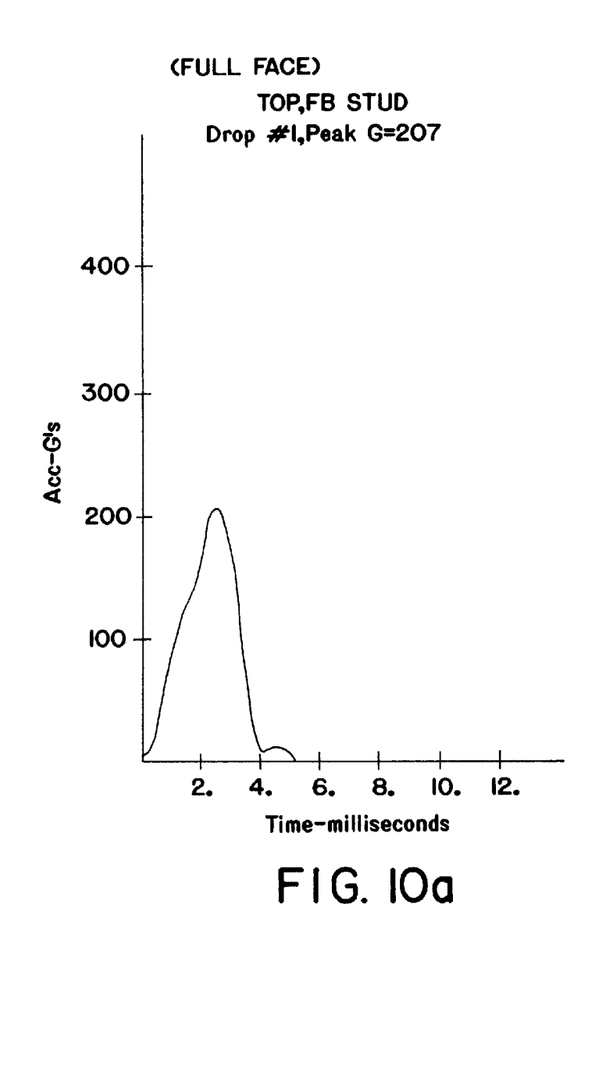
FIGS. 10a and 10b show test results for a shinpad sold under the trade name UMBRO-Pro Shinpad.
Figure 10B:
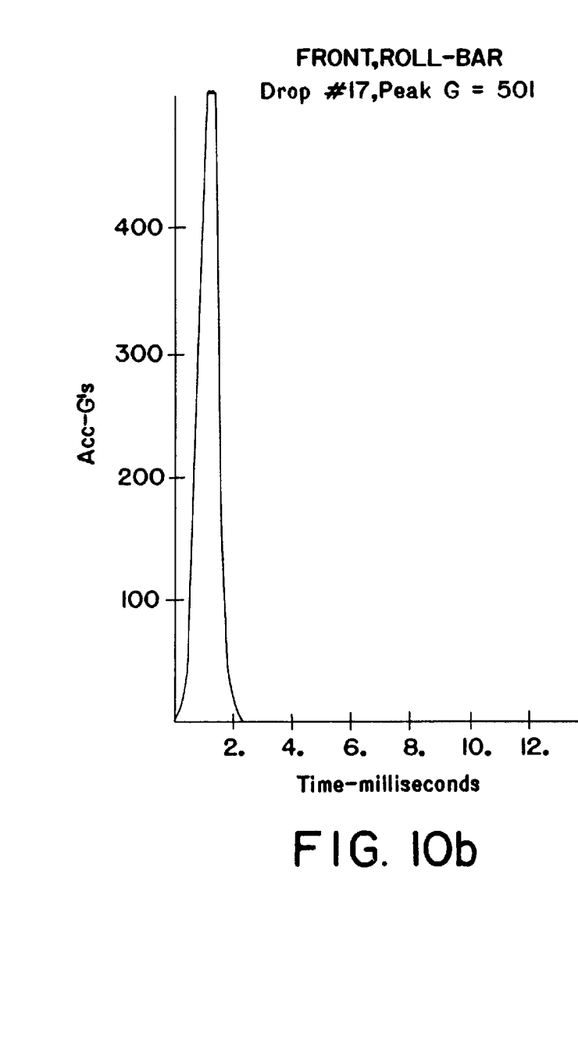

FIGS. 10a and 10b show a plot of acceleration measured in gravity unite G, where $G=9.81\ mS^{-2}$, against time measured in milliseconds. It can be seen that the motion of the holding jig was decelerated in approximately 5.5 milliseconds resulting in a peak acceleration of 207 G when dropped onto the array of football studs 38 and holding a commercially available shinpad made by UMBRO and sold as the PRO shinpad. A similar test using the same shinpad against the rollbar resulted in a peak deceleration equivalent to 501 G.

Figure 11A:
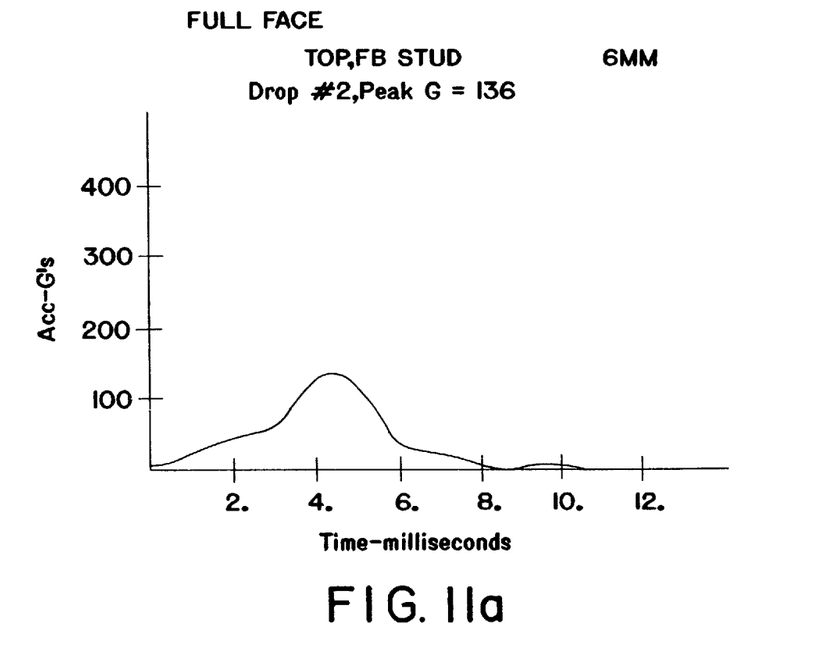
FIGS. 11a, 11b, and 11c show the modified response of the "UMBRO-Pro-Shinpad" when its construction is modified to include a protected element constituting an embodiment of the present invention.
Figure 11B:
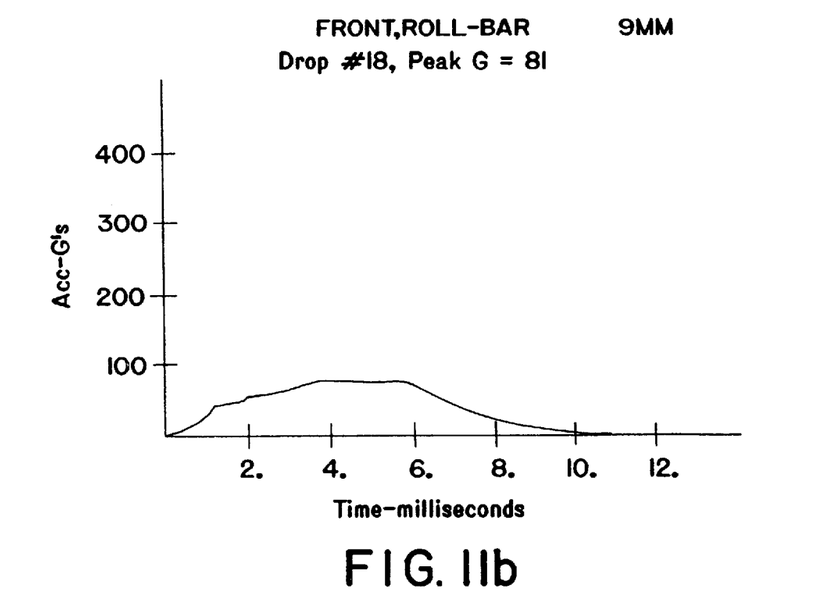
Figure 11C:
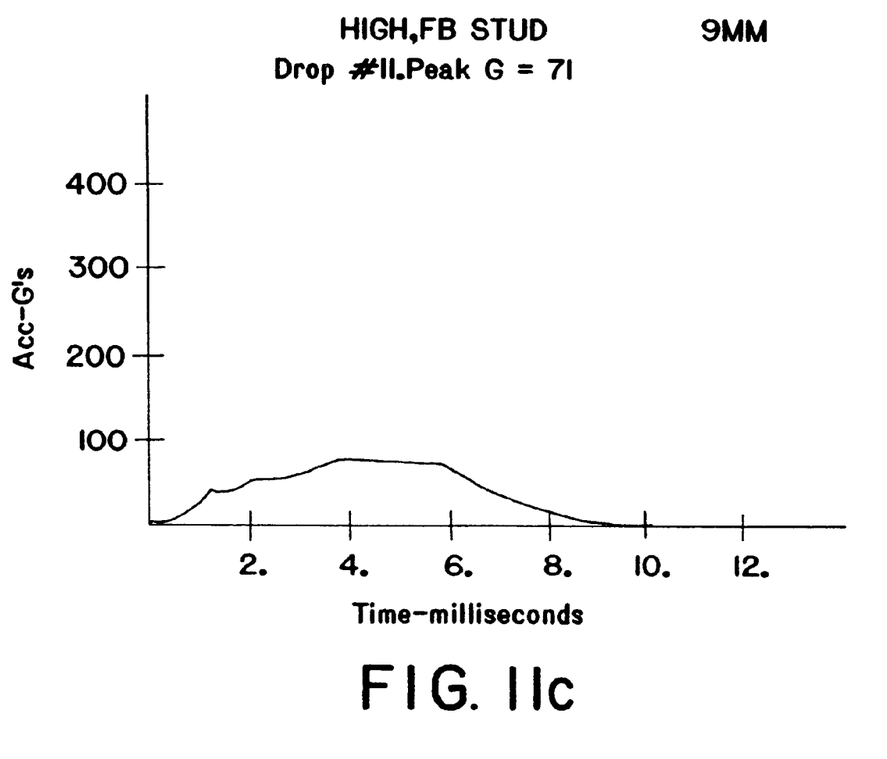

FIGS. 11a to 11c show the results obtained using substantively the same shinpad but incorporated a protective element comprising a honeycomb construction constituting a embodiment of the present invention. The pad was modified by separating the plastic front layer and the foam backing from one another, placing the honeycomb core between the front layer and the foam, and bonding the honeycomb core to the plastic and foam. As shown in FIG. 11a, when the honeycomb sandwich construction has a thickness of 6 mm the deceleration time is increased to approximately 8 milliseconds and the peak acceleration is reduced from 207 to 136 G when impacting the stud configuration. A similar test using the rollbar resulted in the deceleration time being extended to 10 milliseconds and the peak acceleration being reduced from 501 to 81 G when using a 9 mm thick honeycomb sandwich construction. The 9 mm thick construction resulted in a peak deceleration equal to 71 G when tested against the stud away, as shown in FIG. 11c. Thus it can been seen that the peak loading is considerably reduced by use of the honeycomb construction protective element.

Figure 12:
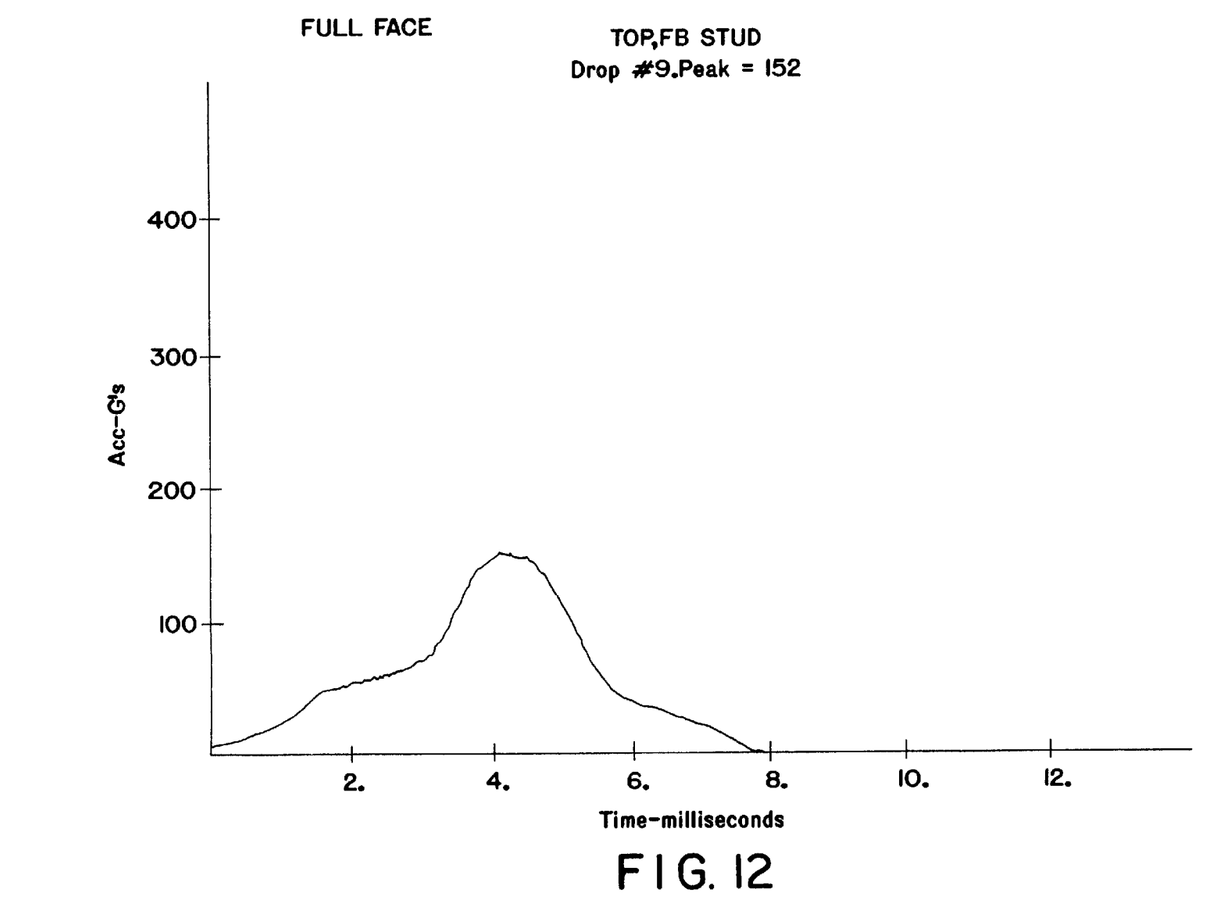
FIG. 12 illustrates the test results for a full face shinpad having a protective element 6 mm thick.
Figure 13:
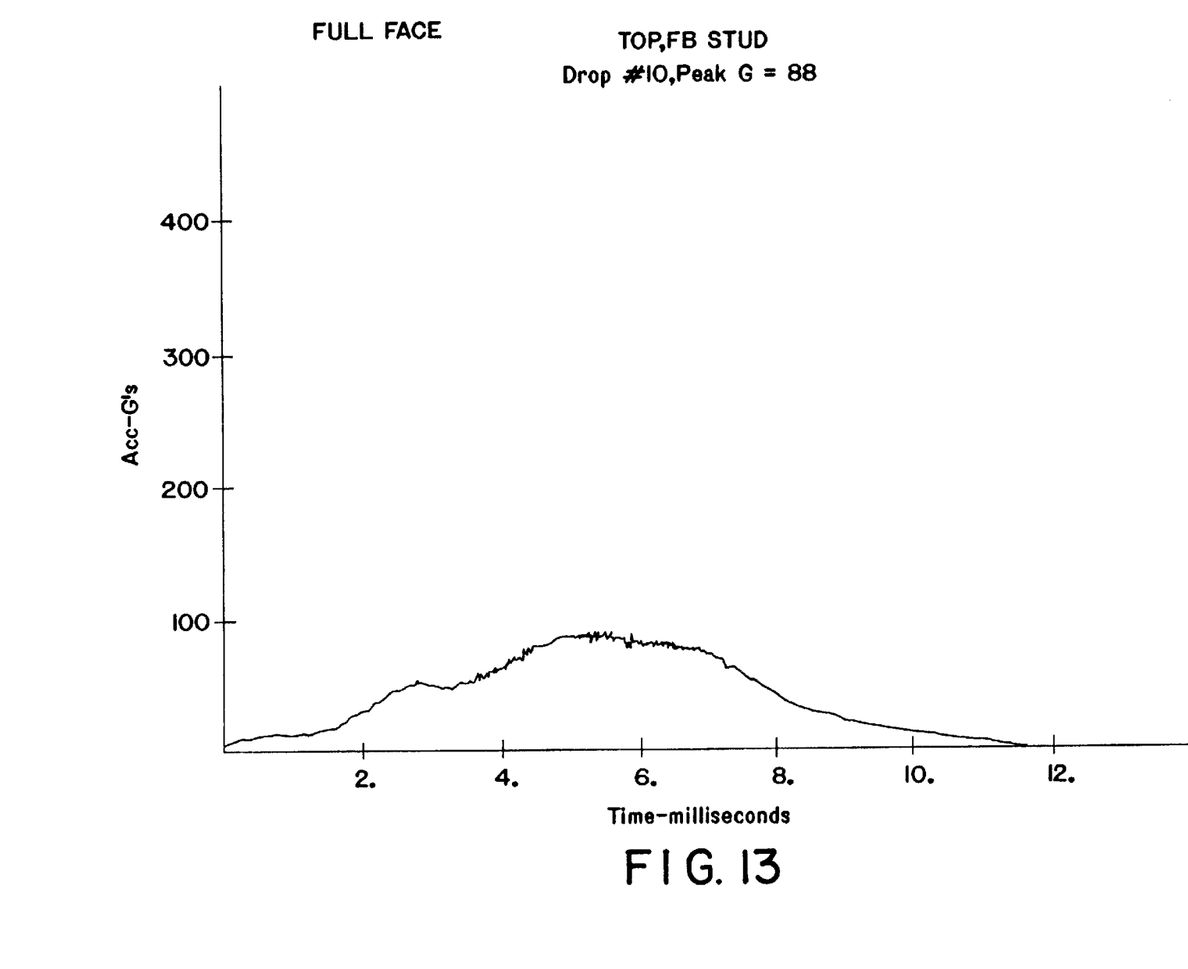
FIG. 13 shows the test results for a full face shinpad having a protective element 9 mm thick.

FIGS. 12 and 13 demonstrate the acceleration profile of a fall-face (ie not segmented) shinpad having a honeycomb sandwich protective element having thicknesses of 6 and 9 mm, respectively. For a 6 mm thick protective element the peak acceleration was equivalent to 152 G, whereas for a 9 mm thick protective element the peak acceleration was reduced to an equivalent of 88 G.

Figure 14A:
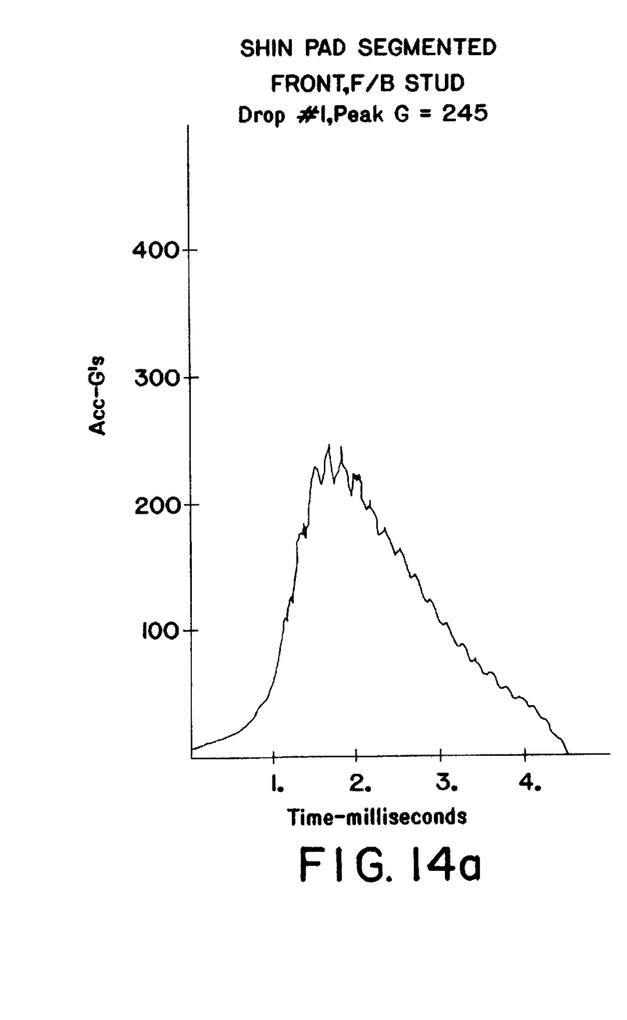
FIGS. 14a and 14b show the test results for a segmented shinpad soled by DIADORA as SAN SIRO.
Figure 14B:
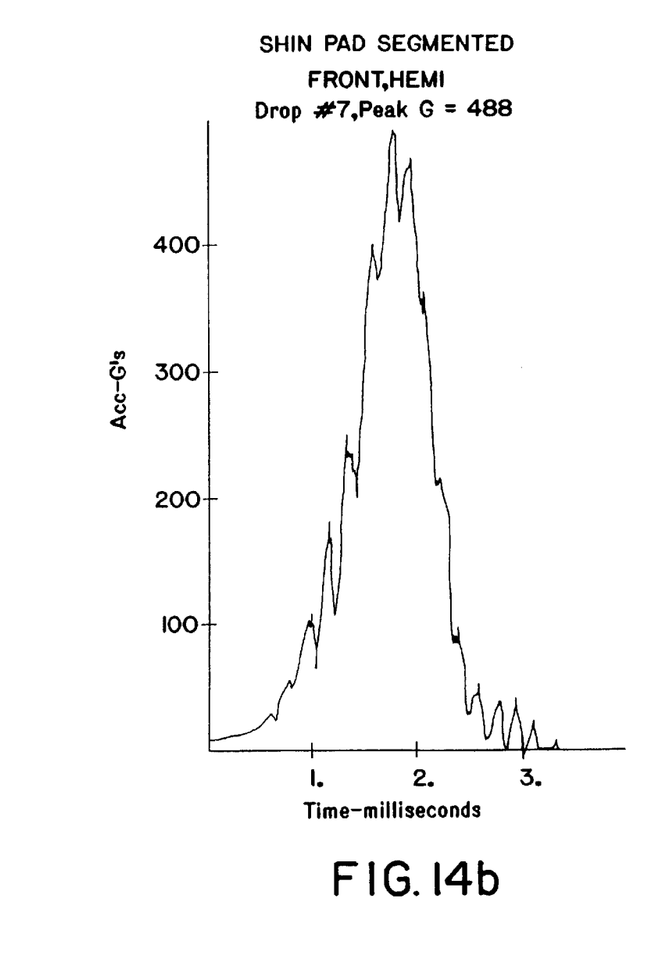
Figure 15A:
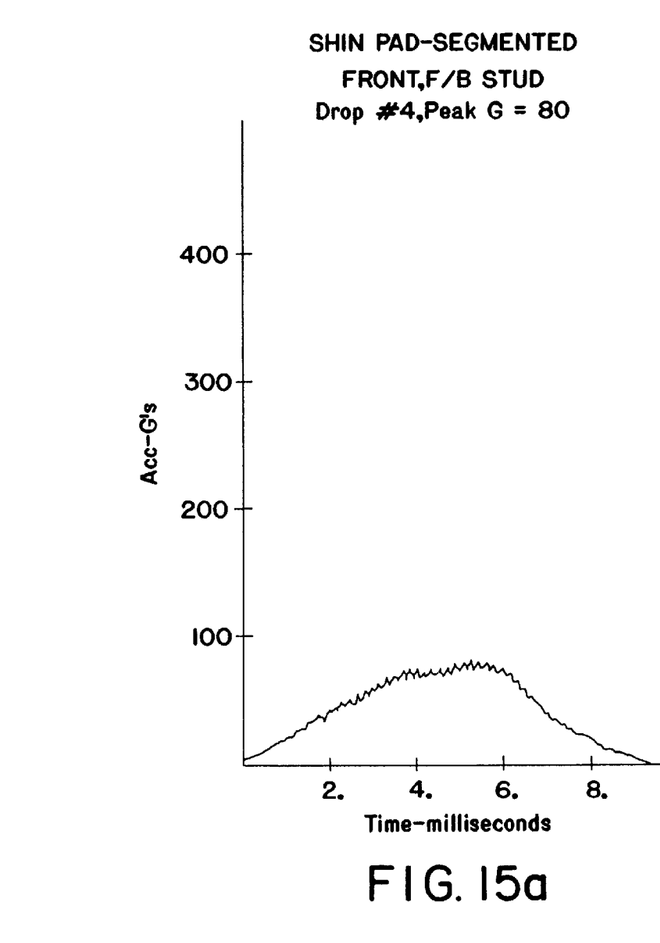
FIGS. 15a and 15b show the results of the same shinpad construction shown in FIGS. 14a and 14b when including a protective element constituting an embodiment of the present invention.
Figure 15B:
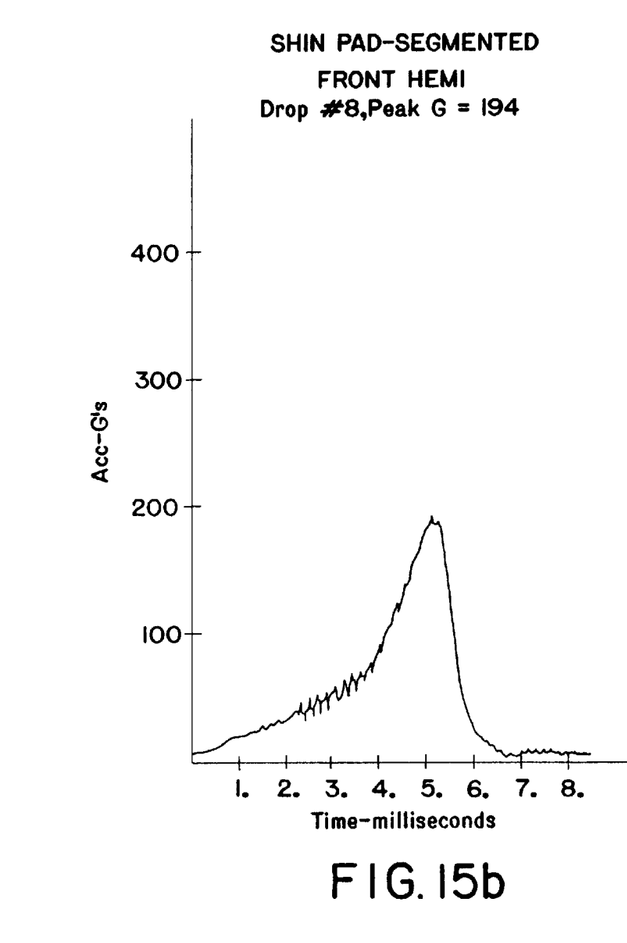

FIGS. 14a and 14b show the results of acceleration versus time far a segmented shinpad sold by DIADORA under the Trade Mark SAN SIRO. When dropped onto a stud configuration, the test load was decelerated in approximately 4.5 milliseconds resulting in a peak deceleration of some 245 G. A similar test performed using the hemispherical test object resulted in a peak deceleration of approximately 488 G. When the shinpad was modified to include protective elements constituting embodiments of the present invention having a maximum thickness of 6 mm, the maximum acceleration reduced to 80 G when dropped against the football stud configuration and 194 G when dropped it the hemispherical test subject. Thus it can be shown that in each case, the maximum deceleration was significantly reduced. This significantly reduces the load transmitted to the users leg, thereby reducing the severity of impact injury caused to a user.

A further significant feature of the present invention it that the honeycomb sandwich protective element will become permanently deformed when subjected to an excessive impact loading. This permanent deformation results in the absorbtion of energy within the honeycomb element, thereby protecting the users leg. Furthermore, the permanent deformation is visually apparent to the user, thereby enabling the shinpad or removable protective element, depending upon the pad design, to be repaired or replaced when convenient. It should be noted pad is designed for multiple impacts on the same site, and will remain undamaged during normal use.

It is thus possible to provide a protective element providing enhanced load reduction and also a visual indication of when the element has become significantly damaged in use.

Figure 16:
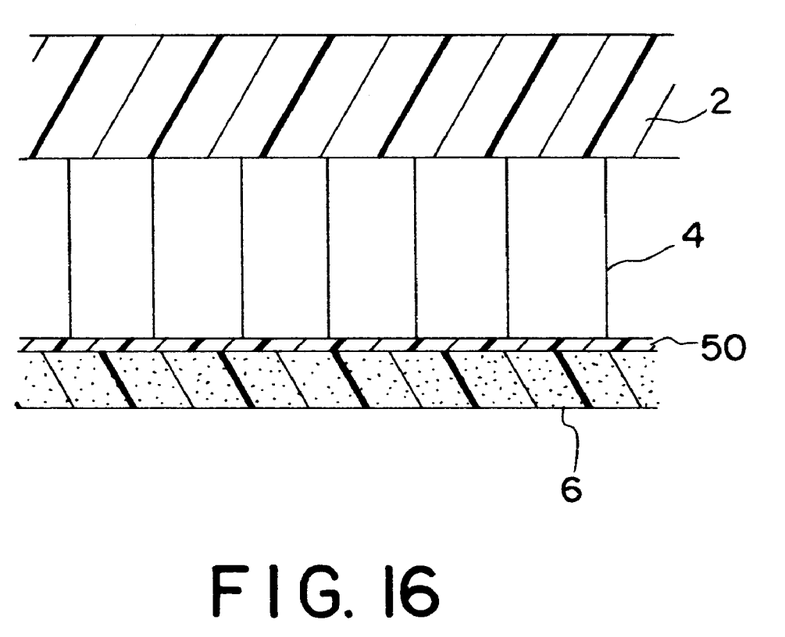
FIG. 16 is a schematic diagram of a further embodiment of the present invention.

In a further embodiment of the present invention, as shown in FIG. 16, a pressure sensitive layer 50 may be interposed between the honeycomb layer 4 and the foam layer 6. The pressure sensitive layer may be a matrix of microcapsules containing a pigment. The wall thickness of the capsules is controlled in order to provide a predetermined burst pressure. Once the burst pressure is reached, the pigment within the microcapsules is allowed to escape thereby changing the colour of the layer 50. A suitable layer 50 is provided by PRESUREX tactile pressure indicating film available from Fuji. The film comes in five grades, and the "super low" grade has an operating pressure range of 70 to 350 psi. Once the pressure acting on the film exceeds 70 psi, colour starts to be released from the film. The intensity of the colour varies with the pressure since more spheres become damaged as the pressure increases. A colour chart is provided such that the colour of the film can be matched to the colour chart in order to determine what pressure was acting on the film. Thus, in this embodiment of the invention, the user can determine what loads the protective element has been subjected to and when to replace the protective element.

What is claimed is:

1. A protective element comprising:
   a first layer;
   a second layer, wherein the first layer and the second layer are adjacent to and on opposing sides of a multicelled element, wherein the first layer faces a direction of threat and transmits light such that the multicelled element is visible therethrough; and
   means for changing a colour of the multicelled element when a predetermined force is applied to the multicelled element, wherein the change in the colour is visible through the first layer.

2. A protective element as claimed in claim 1, wherein, in use, the second layer faces towards the item being protected, and the first layer transmits impact to the multicelled element, and the second layer acts as a support for the multicelled element.

3. A protective element as claimed in claim 1, characterised in that the multicelled element has open cells with adjacent cells separated by walls.

4. A protective element as claimed in claim 3, characterised in that adjacent cells share a common wall.

5. A protective element as claimed in claim 1, charaterised in that the walls of the multicelled element are of non-uniform thickness.

6. A protective element as claimed in claim 1, in which the second layer is a foam.

7. A protective element as claimed in claim 1, in which the first layer is a thermoplastic material.

8. A protective element as claimed in claim 1, characterised in that the multicelled element is covered with a layer whose appearance is different to that of the multicelled element such that damage to the multicelled element can be seen by virtue of a change in appearance of the layer.

9. A protective element as claimed in claim 1, in which the first layer is transparent.

10. A protective element as claimed in of claim 1, in which the first layer is translucent.

11. An item of protective clothing comprising a protective element as claimed in claim 1.

12. An item of protective clothing as claimed in claim 11, characterised in that the protective clothing is selected from a group comprising a shin pad, leg pad, ankle pad, jacket and a helmet.

13. An item of protective clothing as claimed in claim 11, characterised in that the protective clothing is an item of footwear.

14. An item of protective clothing, as claimed in claim 11, in which the item is a boot.

15. An insole comprising a protective element as claimed in claim 1.

16. The protective element of claim 1, wherein the predetermined force is a force sufficient to damage the multicelled element.

17. The protective element of claim 8 wherein said layer is a metal.

18. The protective element of claim 17 wherein the metal comprises chromium.

19. The protective element of claim 8 wherein said layer is a different colour than the multicelled element.

20. The protective element of claim 1, wherein the means for changing the colour of the multicelled element is a coating, wherein the coating cracks when the predetermined force is applied to the multicelled element.

21. The protective element of claim 1, further comprising a pressure sensitive element adjacent the multicelled element and arranged to change colour when the pressure thereon exceeds a predetermined value.

22. The protective element of claim 21, wherein the change in colour is visible through the first layer.

23. The protective element of claim 21, wherein the pressure sensitive element comprises a layer having pigment trapped within cells, said cells bursting to release the pigment when the predetermined pressure is reached.

24. The protective element of claim 1, wherein the means for changing the colour of the multicelled element is a pigment disposed within at least one cell, wherein the cell ruptures when the predetermined force is applied to the multicelled element.

25. An item of clothing, wherein the item of clothing is selected from the group consisting of a shin pad, a leg pad, an ankle pad, a jacket, a helmet, and footwear, wherein the item of clothing comprises a protective element and the protective element comprises first and second layers adjacent to and on opposing sides of a multicelled element, wherein the first layer faces a direction of threat, transmits light such that the multicelled element is visible there through, wherein the multicelled element is visible through the first layer such that damage to the multicelled element is identifiable.

26. A protective element as claimed in claim 25, wherein, in use, the second layer faces towards the item being protected, and the first layer transmits impact to the multicelled element; and the second layer acts as a support for the multicelled element.

27. A protective element as claimed in claim 25, characterised in that the multicelled element has open cells with adjacent cells separated by walls.

28. A protective element as claimed in claim 27, characterised in that adjacent cells share a common wall.

29. A protective element as claimed in claim 25, characterised in that the walls of the multicelled element are of non-uniform thickness.

30. A protective element as claimed in claim 25, in which the second layer is a foam.

31. A protective element as claimed in claim 25, which the first layer is a thermoplastic material.

32. A protective element as claimed in claim 25, characterised in that the multicelled element is covered with a layer whose appearance is different to that of the multicelled element such that damage to the multicelled element can be seen by virtue of a change in appearance of the layer.

33. A protective element as claimed in claim 25, in which the first layer is transparent.

34. A protective element as claimed in of claim 25, in which the first layer is translucent.

35. An item of protective clothing, as claimed in claim 25, in which the item is a boot.

36. The protective element of claim 25 wherein colour change means are provided such that damage to the multicelled element results in a colour change which can be visibly identified through the first layer.

37. The protective element of claim 32 wherein said layer is a different colour than the multicelled element.

38. The protective element of claim 32 wherein said layer is a metal.

39. The protective element of claim 38 wherein the metal comprises chromium.

40. The protective element of claim 32 wherein the colour of the multicelled element becomes visible when the coating ruptures due to damage to the multicelled element.

41. The protective element of claim 25, further comprising a pressure sensitive element adjacent the multicelled element and arranged to change colour when the pressure thereon exceeds a predetermined value.

42. The protective element of claim 41, wherein the change in colour is visible thorough the first layer.

43. The protective element of claim 41, wherein the pressure sensitive element comprises a layer having pigment trapped within cells, said cells bursting to release the pigment when the predetermined pressure is reached.

* * * * *